US007853618B2

(12) United States Patent
Yuan et al.

(10) Patent No.: US 7,853,618 B2
(45) Date of Patent: Dec. 14, 2010

(54) METHODS AND APPARATUS FOR GENERIC SEMANTIC ACCESS TO INFORMATION SYSTEMS

(75) Inventors: Jun Yuan, Sammamish, WA (US); Babak Hamidzadeh, Rockville, MD (US)

(73) Assignee: The Boeing Company, Chicago, IL (US)

( * ) Notice: Subject to any disclaimer, the term of this patent is extended or adjusted under 35 U.S.C. 154(b) by 427 days.

(21) Appl. No.: 11/186,253

(22) Filed: Jul. 21, 2005

(65) Prior Publication Data

US 2007/0022107 A1  Jan. 25, 2007

(51) Int. Cl.
G06F 7/00 (2006.01)
(52) U.S. Cl. ......................................... 707/794; 706/55
(58) Field of Classification Search ....................... 707/3
See application file for complete search history.

(56) References Cited

U.S. PATENT DOCUMENTS

| | | | |
|---|---|---|---|
| 5,842,202 A | 11/1998 | Kon | |
| 5,913,214 A | 6/1999 | Madnick et al. | |
| 5,918,236 A | 6/1999 | Wical | |
| 5,940,821 A | 8/1999 | Wical | |
| 5,953,716 A | 9/1999 | Madnick et al. | |
| 5,953,718 A | 9/1999 | Wical | |
| 5,970,490 A | 10/1999 | Morgenstern | |
| 6,038,560 A | 3/2000 | Wical | |
| 6,067,548 A | 5/2000 | Cheng | |
| 6,076,088 A | 6/2000 | Paik et al. | |
| 6,094,652 A | 7/2000 | Faisal | |
| 6,101,515 A | 8/2000 | Wical et al. | |
| 6,112,201 A | 8/2000 | Wical | |
| 6,154,213 A | 11/2000 | Rennison et al. | |
| 6,178,416 B1 | 1/2001 | Thompson et al. | |
| 6,199,195 B1 | 3/2001 | Goodwin et al. | |
| 6,240,410 B1 | 5/2001 | Wical | |
| 6,246,975 B1 | 6/2001 | Rivonelli et al. | |
| 6,263,335 B1 | 7/2001 | Paik et al. | |
| 6,282,537 B1 | 8/2001 | Madnick et al. | |
| 6,304,864 B1 | 10/2001 | Liddy et al. | |
| 6,311,194 B1 | 10/2001 | Sheth et al. | |
| 6,363,378 B1 | 3/2002 | Conklin et al. | |
| 6,389,409 B1 | 5/2002 | Horovitz et al. | |
| 6,405,190 B1 | 6/2002 | Conklin | |
| 6,415,283 B1 | 7/2002 | Conklin | |
| 6,424,358 B1 | 7/2002 | DiDomizio et al. | |
| 6,460,034 B1 | 10/2002 | Wical | |

(Continued)

OTHER PUBLICATIONS

Volker Haarslev and Ralf Moller, "RACER User's Guide and Release Manual Version 1.7.19", Apr. 26, 2004.*

(Continued)

*Primary Examiner*—Neveen Abel Jalil
*Assistant Examiner*—Vei-Chung Liang
(74) *Attorney, Agent, or Firm*—Harness, Dickey & Pierce, P.L.C.

(57) ABSTRACT

A method of providing information from at least one information resource. A semantic query is received that includes one or more generic constructs referencing an ontology relating to a domain of the information resource(s). A representation of the semantic query in an ontology representation language is inferred from the constructs. The query representation is used to access the information resource(s). This method allows a user to formulate database queries semantically without knowledge as to underlying data structures.

17 Claims, 9 Drawing Sheets

U.S. PATENT DOCUMENTS

| | | | |
|---|---|---|---|
| 6,463,433 | B1 | 10/2002 | Baclawski |
| 6,484,155 | B1 | 11/2002 | Kiss et al. |
| 6,498,795 | B1 | 12/2002 | Zhang et al. |
| 6,510,406 | B1 | 1/2003 | Marchisio |
| 6,513,027 | B1 | 1/2003 | Powers et al. |
| 6,513,059 | B1 | 1/2003 | Gupta et al. |
| 6,526,443 | B1 | 2/2003 | Goldsmith et al. |
| 6,535,873 | B1 | 3/2003 | Fagan et al. |
| 6,553,367 | B2 | 4/2003 | Horovitz et al. |
| 6,564,263 | B1 | 5/2003 | Bergman et al. |
| 6,584,470 | B2 | 6/2003 | Veale |
| 6,636,886 | B1 | 10/2003 | Katiyar et al. |
| 6,640,231 | B1 | 10/2003 | Anderson et al. |
| 6,654,731 | B1 | 11/2003 | Mahesh |
| 6,675,159 | B1 | 1/2004 | Lin et al. |
| 6,678,677 | B2 | 1/2004 | Roux et al. |
| 6,687,696 | B2 | 2/2004 | Hofmann et al. |
| 6,691,151 | B1 | 2/2004 | Cheyer et al. |
| 6,732,090 | B2 | 5/2004 | Shanahan et al. |
| 6,766,316 | B2 | 7/2004 | Caudill et al. |
| 6,778,979 | B2 | 8/2004 | Gredenstette et al. |
| 6,778,991 | B2 | 8/2004 | Tenorio |
| 2003/0158841 | A1* | 8/2003 | Britton et al. ................ 707/3 |
| 2004/0117346 | A1* | 6/2004 | Stoffel et al. ................ 707/1 |
| 2005/0203920 | A1* | 9/2005 | Deng et al. ................ 707/100 |

OTHER PUBLICATIONS

Matthew Horridge et al, "A Practical Guide to Building OWL Ontologies Using the Protégé-OWL Plugin and CO-ODE Tools Edition 1.0", Aug. 27, 2004.*

Yuan et al. "A Semantic Information Integration Tool Suite", VLDB '06, Sep. 12-15, 2006 p. 1171-1174.*

Wolfgang Nejdl et al. "EDUTELLA: A P2P Networking Infrastructure Based on RDF", WWW 2002, May 7-11, 2002, p. 604-615.*

Jeremy J. Carroll et al. "JENA: Implementing the Semantic Web Recommendations", WWW 2004, May 17-22, 2004, p. 74-83.*

Volker Haarslev and Ralf Moller, "Racer: A Core Inference Engine for the Semantic Web", In 2nd International Workshop on Evaluation of Ontology-based Tools, EON-2003, Oct. 20, 2003, Sanibel Island, Florida.*

Edna Ruckhaus and Maria-Esther Vidal, "XWebSOGO: An Ontology Language to Describe and Query Web Sources", Fifth International Workshop on Web Information and Data Management (WIDM'03) Nov. 7-8, 2003, p. 62-65.*

Holger Knublauch et al., "Editing Description Logic Ontologies with the Protégé OWL Plugin", International Workshop on Description Logics, DL 2004, Jun. 6-8, 2004, Whistler, British Columbia, Canada.*

Carroll et al., "Jena: Implementing the Semantic Web Recommendations", WWW 2004, May 17-22, New York, p. 74-83.*

Part II. Ontological Semantics as Such, Sep. 8, 2005, pp. 1-2.

OntoQuery Ontology-based Querying, Sep. 8, 2005, pp. 1-8.

Heidi Gregersen and Christian S. Jensen, On the Ontological Expressiveness of Temporal Extensions to the Entity-Relationship Model, 1999, pp. 110-121.

* cited by examiner

FIG. 13

METHODS AND APPARATUS FOR GENERIC SEMANTIC ACCESS TO INFORMATION SYSTEMS

FIELD OF THE INVENTION

The present invention relates generally to information systems, and more particularly (but not exclusively) to interfaces for querying information systems.

BACKGROUND OF THE INVENTION

In a large enterprise, information tends to be distributed among a wide range of heterogeneous data systems. A given database system typically provides a system-specific querying interface, e.g., a database query language allowing users to formulate querying requests in a system-specific format. A query language typically is closely related to aspects of the underlying data. Accordingly, query languages can vary greatly as to syntax and/or power of expressiveness. Users who submit queries to database engines typically must use more than one query language and/or interface to retrieve and integrate related pieces of information together from different data sources. Normally, an underlying database schema not only details a structure of how data is to be organized, but it also provides guidelines about how data is to be queried.

Even though information may be presented in various systems in various ways, different pieces of information can be semantically correlated. Semantics, however, cannot be explicitly represented by many current data models. Semantics may be represented only implicitly (if at all), for example, by internal mechanisms such as database integrity constraints. Traditional query languages built on top of such data models thus are not capable of expressing explicit semantics. For example, when a user uses a relational query language, (s)he frequently has to define one or more join operations in order to inquire as to connections between data items in a plurality of tables. In order to have such join operations exactly reflect the semantics of a query, the user typically needs substantial knowledge of both relational database theory and the query language itself.

An average user typically has little, if any, training in traditional query languages and database systems. A query language thus is desirable which enables a user to use his or her semantic understanding to retrieve information. Additionally, information consumers today include not only human beings, but also computer systems. Thus it also is desirable for the semantics of query answers to be both human- and machine-understandable.

SUMMARY OF THE INVENTION

The present invention, in one implementation, is directed to a method of providing information from at least one information resource. A semantic query is received that includes one or more generic constructs referencing an ontology relating to a domain of the information resource(s). A representation of the semantic query in an ontology representation language is inferred from the constructs. The query representation is used to access the information resource(s).

In another implementation, a computer system allows a user to semantically query a database of the system. The system includes a processor and memory configured to receive from the user a semantic query including a plurality of generic constructs referencing an ontology relating to a domain of the database. The system uses inferences from the constructs to obtain a representation of the semantic query in an ontology representation language. The system uses the query representation to access the database.

In yet another implementation, a computer-readable medium includes instructions for receiving a semantic query from a user. The semantic query includes a plurality of generic constructs referencing an ontology relating to a domain of the database. Inferences from the constructs are used to obtain a representation of the semantic query in an ontology representation language. The query representation is used to access the database. The computer-readable medium also includes instructions for returning an answer to the user as an instantiation of the referenced ontology.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 13 is a screenshot of a graphical query interface displaying results of a semantic query in accordance with one implementation of the invention.

DETAILED DESCRIPTION OF PREFERRED EMBODIMENTS

The following description of various embodiments is merely exemplary in nature and is in no way intended to limit the invention, its application, or uses. For purposes of clarity, the same reference numbers may be used in the Figures to identify similar elements.

The present invention provides information consumers, which may include human beings and/or computer systems, with a user-friendly and convenient way to retrieve information. Despite the fact that information may be physically stored in various types of data systems, possibly with different data models, different formats, and different information access methods, information can be retrieved solely by its own semantic meanings.

In one implementation, the present invention is directed to a method of providing semantic information access from at least one existing information resource. A semantic query is received that includes one or more generic constructs referencing an ontology relating to a domain of the information resource. A representation of semantic query in an ontology representation language is inferred from the constructs. The query representation is used to explicitly capture the semantics of the query, to access the underlying information resource, and to deliver retrieved information as an instantiation of the referenced ontology.

In another implementation, a computer system allows an information consumer to semantically query a database of the system. The system includes a processor and memory configured to receive from the consumer a semantic query including a plurality of generic constructs referencing an ontology relating to a domain of the database. The system uses inferences from the constructs to obtain a representation of the semantic query in an ontology representation language. The system uses the query representation to explicitly present the semantics of the query, to access the database, and to deliver answers as an instantiation of the referenced ontology.

In yet another implementation, a computer-readable medium includes instructions for receiving a semantic query from a user. The semantic query includes a plurality of generic constructs referencing an ontology relating to a domain of the database. Inferences from the constructs are used to obtain a representation of the semantic query in an ontology representation language. The query representation is used to explicitly present the semantics of the query, to access the database, and to deliver answers as an instantiation of the referenced ontology.

Figure 1:
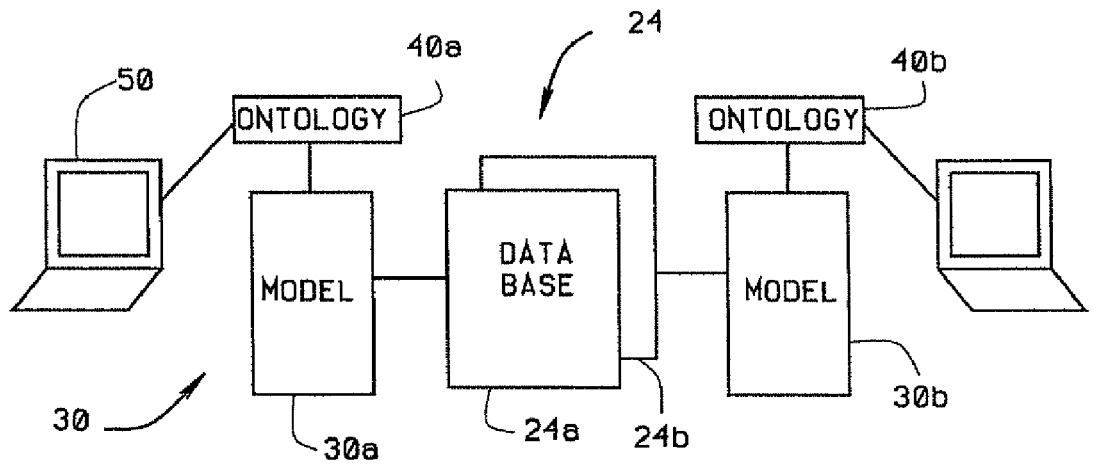
FIG. 1 is a diagram of a computer system configured in accordance with one implementation of the invention.

A computer system configured in accordance with one implementation of the invention is indicated generally in FIG. 1 by reference number 20. The system 20 is, for example, a large enterprise system including one or more databases indicated generally by reference number 24. In the present example, two databases 24a and 24b are included in the system 20. It should be noted, however, that implementations of the invention also are contemplated in connection with a single database and in connection with more than two databases. A database 24 may be, for example, a relational database in which data is stored as a plurality of tables, trees and/or other structures accessible by a user using database language(s) such as SQL.

In one implementation, data in one or more of the databases 24 may be represented by a model indicated generally by reference number 30. Such models may be implemented in various representation languages, including but not limited to relational data definition languages, XML document type definitions (DTD), XML schema definitions (XSD), table-structured layout, and/or hierarchical/network structures. In the present example, models 30a and 30b may be implemented in the same or different ontological representation languages.

A model 30 represents database information relative to one or more ontologies 40. Such ontologies may be implemented in various ontological representation languages, including but not limited to RDF (Resource Description Framework), OWL (Web Ontology language), EER (Extended Entity-Relationship), DAML+OIL (DARPA Agent Markup Language), and/or Datalog. An ontology 40 typically defines concepts of a domain of the database information and specifies relationships among the defined concepts. It should be noted that although two ontologies 40a and 40b are included in the present example, it is contemplated that in some implementations a single ontology could be used in connection with a plurality of models 30. It also should be noted that in some implementations, a database 24 and model 30 may be integrated. For example, data may be stored in a database 24 as a model 30.

In accordance with one implementation of the invention, a user of the system 20 may use a personal computer 50 or other computer to query the database(s) 24 via a query interface operable with respect to a plurality of types of information sources. As further described below, the query interface includes an internal formalism that is essentially neutral relative to particular ontological representation languages and/or standards.

A method of providing information to a user from at least one of the databases 24 includes receiving from the user a semantic query including generic constructs referencing an ontology 40 relating to a domain of the database(s) 24. A representation of the semantic query in an ontology representation language is inferred from the constructs, via a built-in inference capability of the ontology representation language in which the ontology 40 is implemented. The query representation is used to explicitly present the semantics of the query and to access the database 24. Such method may be based, for example, on generic ontological constructs such as "concept" and "relationship". A generic construct is a construct for which counterparts are available in specifications for essentially all ontological languages. When defining a query in accordance with some implementations of the invention, a user may pick a concept as a starting point and navigate an ontology 40 through selected relationships.

DEFINITIONS

Ontology is commonly used to explicitly express semantics for a given application domain. In various implementations of the present invention, an ontology 40 can be queried directly. In order to be independent of various ontological languages, including but not limited to a particular language used to implement a model 30, querying is performed using generic constructs of ontology. In such manner, querying can be performed with reference to any one of a plurality of ontological specifications. The following definitions are included to enhance understanding by describing a foundation for various implementations of the invention. The following definitions, however, are not intended as limitations on the scope of the invention.

Referenced Ontology

Generally, a referenced ontology may be denoted by O(C, R), where C is a collection of concepts and R is a collection of relationships. A concept can exist independently in a referenced ontology, but the existence of a relationship is dependent upon two or more concepts. A relationship presents a semantic linkage between or among a plurality of concepts. A relationship in a referenced ontology may be denoted by $r(c_1, c_2, \ldots, c_n)$ ($n \geq 2$), where $c_1, c_2, \ldots, c_n$ are concepts. Where the order of $c_1, c_2, \ldots, c_n$ is insignificant, the relationships are said to be non-directional.

Figure 2:
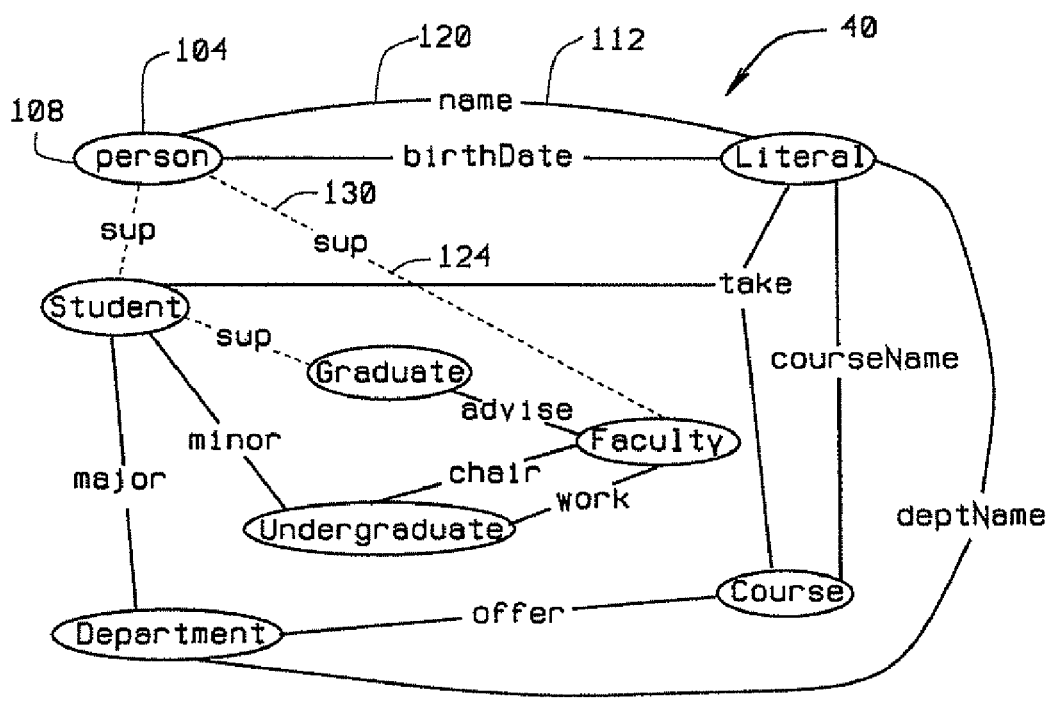
FIG. 2 is a diagram of a referenced ontology in accordance with one implementation of the invention.

Referring to FIG. 2, an exemplary referenced ontology 40, referred to in this description as "tiny-university" ontology, includes a plurality of concepts 104, each concept represented by an oval 108. Each labeled solid line 112 represents a relationship 120 between or among a plurality of concepts 104. Relationships 120 are assumed to be non-directional. A dotted line 124 indicates a hierarchy 130 between concepts

104, e.g., an inheritance or predefined super/sub relationship between concepts 104. A super/sub relationship 130 allows a concept 104 to inherit all relationships 120 defined in its direct or indirect super-concept(s) 104.

Concept Node

Figure 3:
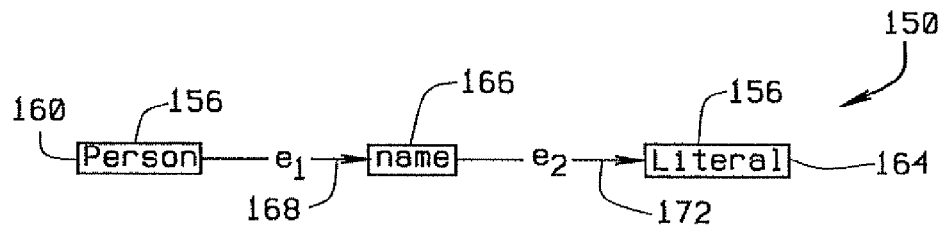
FIG. 3 is a diagram of exemplary nodes and edges in accordance with one implementation of the invention.

Exemplary nodes are shown in a diagram indicated generally in FIG. 3 by reference number 150. Referring to FIGS. 2 and 3, a concept node 156 can be denoted by $v_c(c)$, where c is a concept 104 in the ontology 40, c is called the referenced concept of $v_o$, and $v_c$ is called a concept node for c.

Relationship Node

Referring again to FIGS. 2 and 3, a relationship node 166 can be denoted by $v_r(r)$, where r is a relationship 120 in the referenced ontology 40, r is called the referenced relationship of $v_r$, and $v_r$ is called a relationship node for r.

Edge Between a Concept Node and a Relationship Node

An inbound edge 168 is an edge from a concept node to a relationship node. An outbound edge 172 is an edge from a relationship node to a concept node. An inbound edge may be denoted by $e_{in}$<$v_c$, $v_r$>, where $v_c$ is a concept node and $v_r$ is a relationship node. An outbound edge may be denoted by $e_{out}$<$v_r$, $v_c$>, where $v_r$ is a relationship node and $v_c$ is a concept node.

Two concept nodes 156 are shown in FIG. 3. Specifically, a node 160 references a concept 104 "Person". A node 164 references a concept 104 "Literal". A relationship node 166 references a relationship 120 "name". An edge $e_1$ is an inbound edge 168 from the concept node 160 for "Person" to the relationship node 166 for "name". An edge $e_2$ is an outbound edge 172 from the relationship node 166 for "name" to the concept node 164 for "Literal".

Semantic Query

A semantic query in accordance with one implementation of the invention includes instances of the foregoing constructs, i.e., concept nodes 156, relationship nodes 166 and edges 168 and 172. A semantic query may be denoted by a directed graph, e.g., $Q(V_c, V_r, E)$ where $V_c$ is a collection of concept nodes, $V_r$ is a collection of relationship nodes, and E is a collection of edges; that is, where $V_c = \{v_c | v_c \text{ is a concept node}\}$, $V_r = \{V_r | V_r \text{ is a relationship node}\}$, and $E = \{e | e \text{ is either an inbound edge or an outbound edge}\}$.

The foregoing definition may be said to be a very simple one. In some cases, an instance of such definition might not be a valid semantic query against a particular ontology. Accordingly, in some implementations, given a referenced ontology O(C, R), validation rules are used to verify semantic correctness of a given query. Such rules include the following:

(1) Each concept node $v_c$ of the query references one and only one valid concept in the ontology O.

(2) Each relationship node $v_r$ of the query references one and only one valid relationship in the ontology O.

(3) Edges exist in the semantic query in groups. Each group may be identified by a relationship node in the query, and each group has exactly one inbound edge and one or more outbound edges. Suppose $v_r$ is a relationship node in the semantic query, and r is the relationship that $v_r$ references. The group of edges for $v_r$ may be denoted as ($e_{in}$, $e_{out-1}$, $e_{out-2}$, $e_{out-3}$, . . . , $e_{out-n}$), n≧1, such that:

(a) $e_{in}$=<$V_c$, $V_r$>, $v_c$ is a concept node, and c is the concept that $V_c$ references in the ontology O;

(b) $e_{out-k}$=<$V_r$, $v_k$>, all $v_k$ (1≦k≦n) are concept nodes, and $c_k$ are the concepts that $v_k$ references in the ontology O respectively;

(c) r expresses a relationship among c and all $c_k$ (1≦k≦n).

Rule (3) also implies that given a relationship node $v_r$ in a semantic query, there is one and only one inbound edge, but there may be one or more outbound edges, associated with $v_r$. Where the referenced relationship of $v_r$ describes a kind of relationship among m (m≧2) concepts in the ontology O, the number of the outbound edges from $v_r$ is m−1.

(4) A relationship node cannot independently exist in a semantic query without a corresponding group of edges.

A semantic query Q may be called a valid semantic query against the referenced ontology O where Q meets the above validation rules.

Figure 4A:
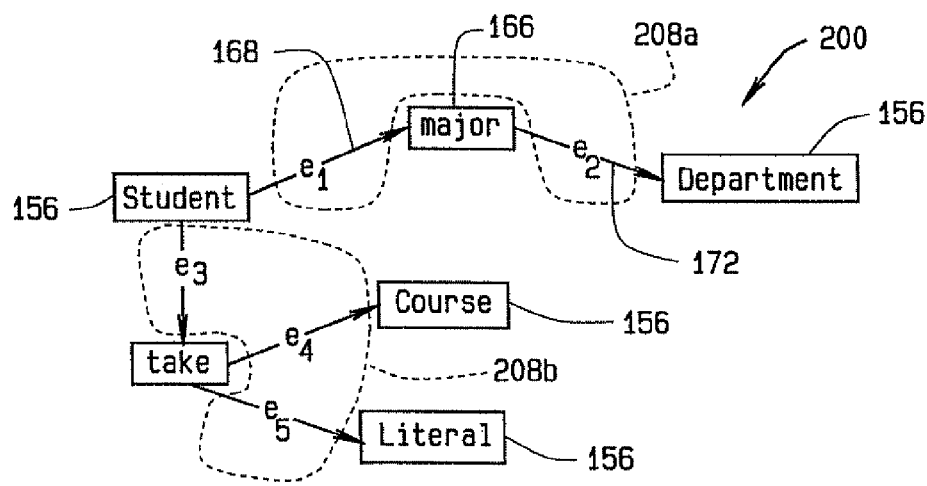
FIGS. 4A and 4B are diagrams of implementations of valid semantic queries.

A valid semantic query against the tiny-university ontology 40 is indicated generally in FIG. 4A by reference number 200. Each concept node 156 in the query 200 uniquely references a concept 104 in the ontology 40. Each relationship node 166 uniquely references a relationship 120 in the ontology 40. Inbound and outbound edges 168 and 172 in the query 200 are in two groups 208a-b, group 208a including edges $e_1$ and $e_2$, and group 208b including edges $e_3$, $e_4$, and $e_5$. Both groups 208 satisfy the above validation rules.

Figure 4B:
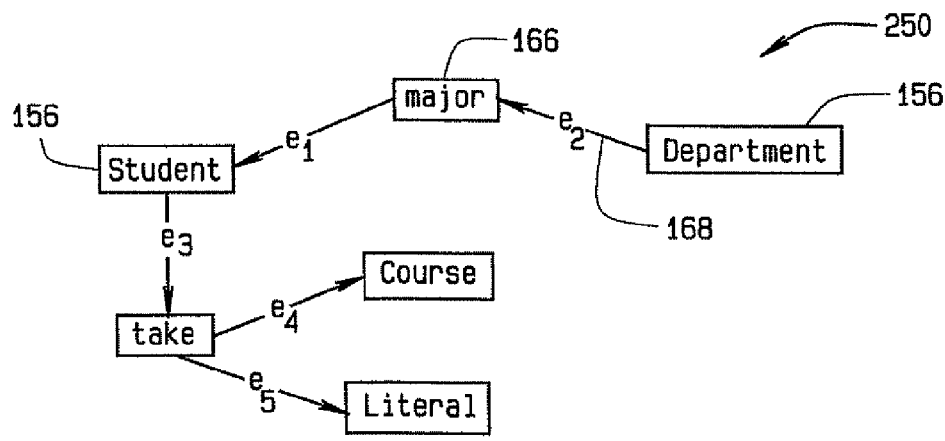

Another valid semantic query against tiny-university ontology 40 is indicated generally in FIG. 4B by reference number 250. In the query 200 of FIG. 4A, a relationship node 166 major takes $e_1$ as inbound edge 168. In the query 250 of FIG. 4B, the relationship node 166 major takes $e_2$ as inbound edge 168. Because the relationship 120 major is defined as non-directional in the ontology 40, when composing a semantic query, a user may define a semantic navigation from concept node 156 Student to concept node 156 Department or from Department to Student. Generally, given a relationship node $v_r$, with $r(c_1, c_2, \ldots, c_n)$ (n≧2) being the referenced relationship in an ontology, it is possible to generate n semantic queries having similar semantics. For example and referring to FIGS. 2, 4A and 4B, each such query represents a unique semantic navigational request from one concept 104 to one or more other concepts 104 through a particular relationship 120.

Semantic Navigation

Each relationship node 166 in a semantic query implies a semantic navigation. Generally, a semantic navigation may be denoted by $N(v_{start}, v_r, V_{range}, E)$, where $v_{start}$ is a starting concept node, i.e., a concept node from which the inbound edge of $v_r$ comes, $V_{range}$ is a collection of concept nodes that all outbound edges of $v_r$ point to, and E is a collection of edges that contains the inbound edge and outbound edge(s) of $v_r$.

Figure 5:
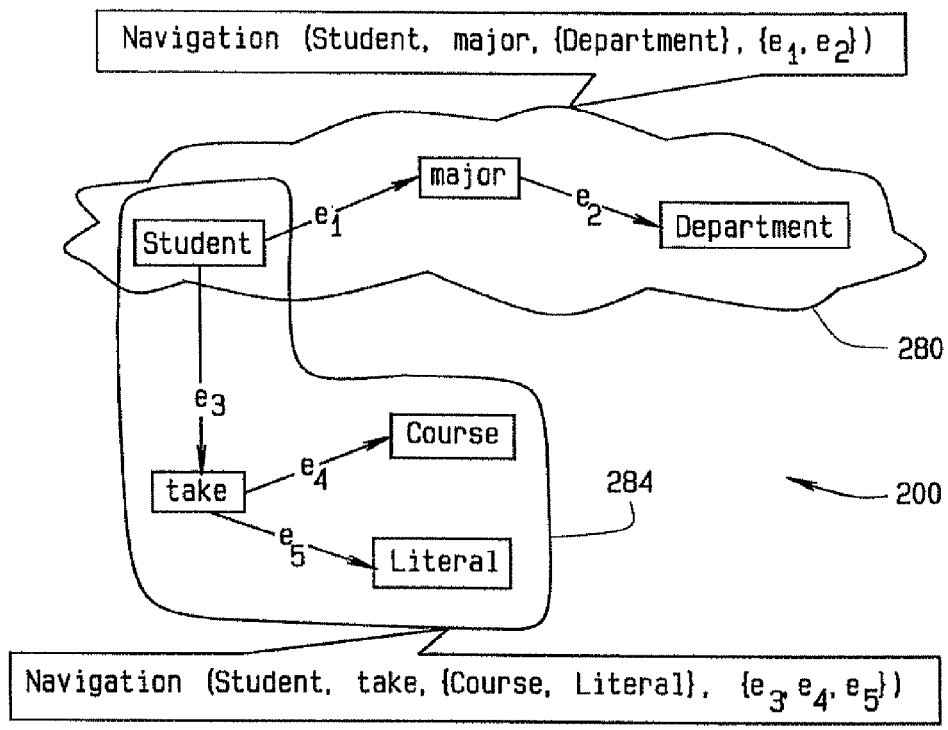
FIG. 5 is a diagram of a query and query navigations in accordance with one implementation of the invention.

As shown in FIG. 5, the query 200 includes two semantic navigations 280 and 284 for the relationship nodes major and take respectively.

Query Manipulations

A semantic query may be built and/or altered by a user implementing one or more query manipulation operations. The following descriptions are exemplary only, and alternative and/or additional query manipulations could be included in other implementations.

Add Concept Node

Given a semantic query $Q(V_c, V_r, E)$ that is valid against an ontology O, ν (Q, c) (where c is a concept in O) denotes an operation to add a new concept node for concept c into Q. The result of the operation ν (Q, c) is a new semantic query $Q'(V'_c, V_r, E)$, such that $V'_c = V_c \cup \{v_c\}$ where $v_c$ is a newly created concept node that references concept c in O.

Add Semantic Navigation

Given a semantic query $Q(V_c, V_r, E)$ that is valid against an ontology O, $\eta(Q, v_c, r)$ (where $v_c$ is a concept node in Q and its referenced concept is c, and r is a relationship that is defined in c or a super-concept of c) denotes an operation to add a semantic navigation into Q. The result of $\eta(Q, v_c, r)$ is a new semantic query $Q'(V'_c, V'_r, E')$ such that:

$$V'_c = V_c \cup V_{new}$$

$$V'_r = V_r \cup \{v_r\}, \text{ where } v_r \text{ is a newly created relationship node that references relationship r in O}$$

$$E = E \cup E_{new}, \text{ where } E_{new} = \{e(v_c, v_r)\} \cup \{e(v_r, v_x) | \forall v_x, v_x \in V_{new}\}$$

Where r is a relationship among concepts $c_1, c_2, \ldots, c_n$, $n \geq 2$, there must exist at least one $c_k$ ($1 \leq k \leq n$), where $c_k$ is either c or a super-concept of c. In either case, $$V_{new} = \{v_x | \forall c_x, c_x \in \{c_1, c_2, \ldots, c_{k-1}, \ldots, c_n\}, v_x \text{ is a newly created concept node for } c_x\}$$

Figure 6:
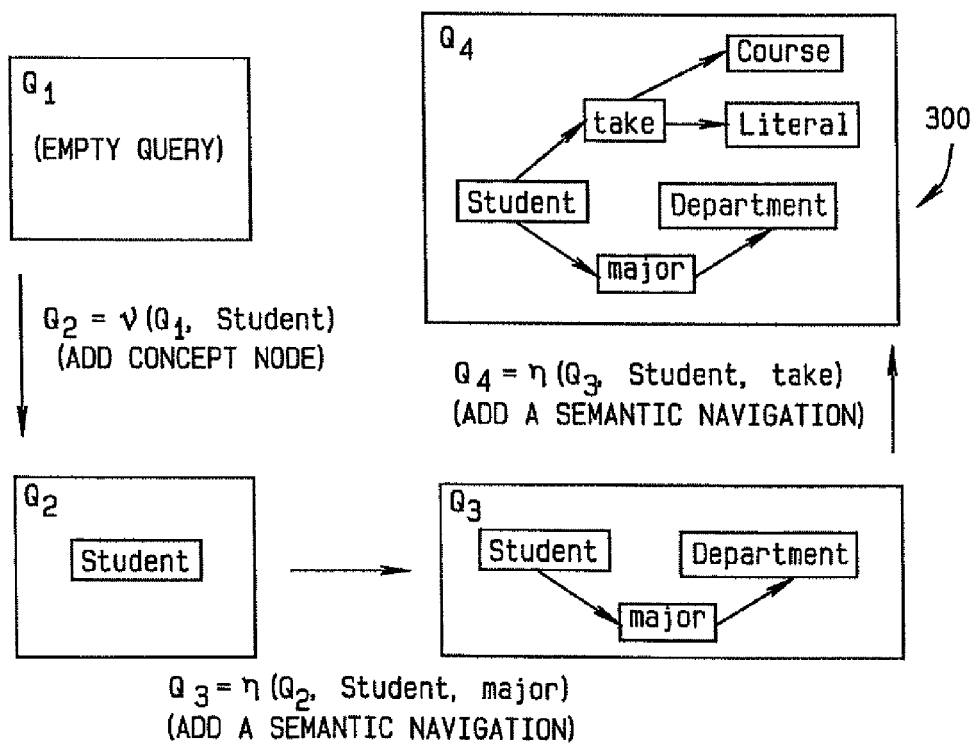
FIG. 6 is a diagram of semantic queries in accordance with one implementation of the invention.

Four semantic queries are indicated generally in FIG. 6 by reference number 300. A query $Q_1$ is an empty query. A query $Q_2$ results from implementing $v(Q_1, \text{Student})$, i.e., an operation to add a concept node for a concept Student into $Q_1$. A query $Q_3$ results from implementing $\eta(Q_2, \text{Student, major})$, i.e., an operation to add a semantic navigation based on the relationship major for concept node Student into $Q_2$. A query $Q_4$ results from implementing $\eta(Q_3, \text{Student, take})$, i.e., an operation to add a semantic navigation based on the relationship take for concept node Student into $Q_3$.

Merge Concept Node

Given a semantic query $Q(V_c, V_r, E)$ where $v_1$ and $v_2$ are two concept nodes for the same concept c, if $v_2$ has no edge pointing to any relationship node in Q, then $v_2$ can be merged with $v_1$. An operation $\mu(Q, v_1, v_2)$ denotes an operation to merge concept nodes $v_1$ and $v_2$ in Q. The operation $\mu(Q, v_1, v_2)$ results in a new semantic query $Q'(V'_c, V_r, E')$, where:

$$V'_c = V_c - \{v_2\}$$

$$E' = \{e(v_x, v_y) | e(v_x, v_y) \in E, v_y \neq v_2\} \cup \{e(v_x, v_1) | \forall e(v_x, v_2), e(v_x, v_2) \in E\}$$

Figure 7:
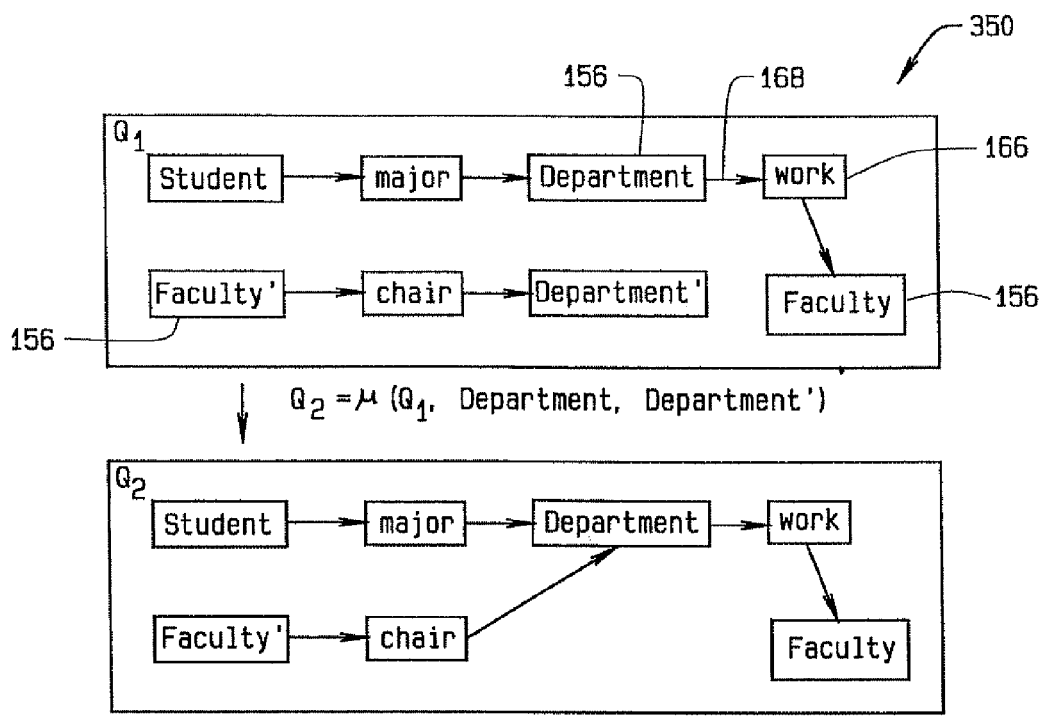
FIG. 7 is a diagram of queries illustrating an operation to merge concept nodes in accordance with one implementation of the invention.

Two exemplary queries are indicated generally in FIG. 7 by reference number 350. A query $Q_2$ results from applying $\mu(Q_1, \text{Department, Department'})$, i.e, an operation to merge a concept node 156 Department' with a concept node 156 Department in $Q_1$. It should be noted that the operation $\mu(Q_1, \text{Department', Department})$ cannot be performed because the concept node Department has an edge 168 pointing to relationship node 166 work, and thus cannot be merged with Department'. Similarly, the operation $\mu(Q_2, \text{Faculty', Faculty})$ could be further performed on $Q_2$ to form another semantic query.

Specialization on Concept Node

Given a semantic query $Q(V_c, V_r, E)$ where $v_c$ is a concept node in Q, c is the referenced concept of $v_c$, and $c_{sub}$ is a sub-concept of c, $\delta(Q, v_c, c_{sub})$ denotes an operation to replace $v_c$ by a newly created concept node for a sub-concept $c_{sub}$. The operation $\delta(Q, v_c, c_{sub})$ results in a new semantic query $Q(V'_c, V_r, E')$, such that:

$$V'_c = V_c - \{v_c\} + \{v_{sub}\}, \text{ where } v_{sub} \text{ is a newly created concept node for } c_{sub}$$

$$E' = \{e(v_x, v_y) | e(v_x, v_y) \in E, v_x \neq v_c\} \cup \{e(v_x, v_{sub}) | \forall e(v_x, v_c), e(v_x, v_c) \in E\} \cup \{e(v_{sub}, v_x) | \forall e(v_c, v_x), e(v_c, v_x) \in E\}.$$

Figure 8:
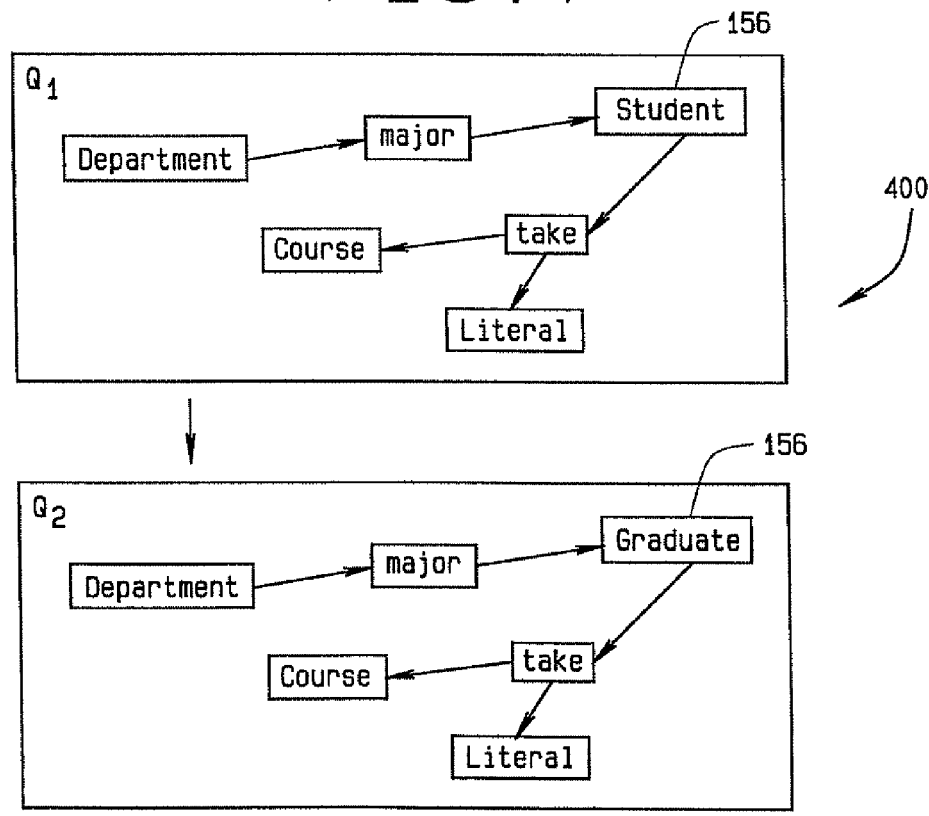
FIG. 8 is a diagram of queries illustrating an operation to replace a concept node with a sub-concept node in accordance with one implementation of the invention.

An exemplary specialization operation is indicated generally in FIG. 8 by reference number 400. A concept node 156 Student in a query $Q_1$ is replaced in a query $Q_2$ by a sub-concept node 156 Graduate.

Query Constraint

A query constraint may be expressed by a statement in logic that includes, for example, a combination of conjunctions ("∧"), disjunctions ("∨"), and negations ("¬"). A comparison expression may be said to be the atomic unit of a logic statement. A comparison expression typically refers to two literals (e.g., statement letters or constants) linked with a comparison operator, for example, "=", "≠", "<", "≦", ">", "≧".

Constant Node

A constant node may be denoted by v(val), where val is the value of the constant node.

Operator Node

An operator node may be denoted by v(op), where op is one of the foregoing comparison operators.

Comparison Expression

A comparison expression may be denoted by $l(v_1, v_2, v^{op})$, where $v_1$ and $v_2$ are concept nodes or constant nodes, and $v^{op}$ is an operator node.

A logic statement is in disjunctive normal form if it is a disjunction consisting of one or more disjuncts, each of which is a conjunctive of one or more comparison expressions. In other words, a logic statement is in disjunctive normal form if it consists of a disjunction of conjunctions where no conjunction contains a disjunction. It has been proven that a logic statement of any complexity can be transformed into an equivalent disjunctive normal form. Therefore, for the purpose of simplicity and without losing generality, query constraints discussed herein are assumed to be in disjunctive normal form.

A logic statement in disjunctive normal form can be treated as a collection of conjunctions. Each conjunction in a disjunctive normal form, denoted by $\wedge_{i=1}^n l_i(v_i^1, v_i^2, v_i^{op})$, can be attached to a semantic query. Therefore, when a plurality of conjunctions are involved in a query constraint, they can be treated as separate attachments to the original semantic query.

Figure 9:
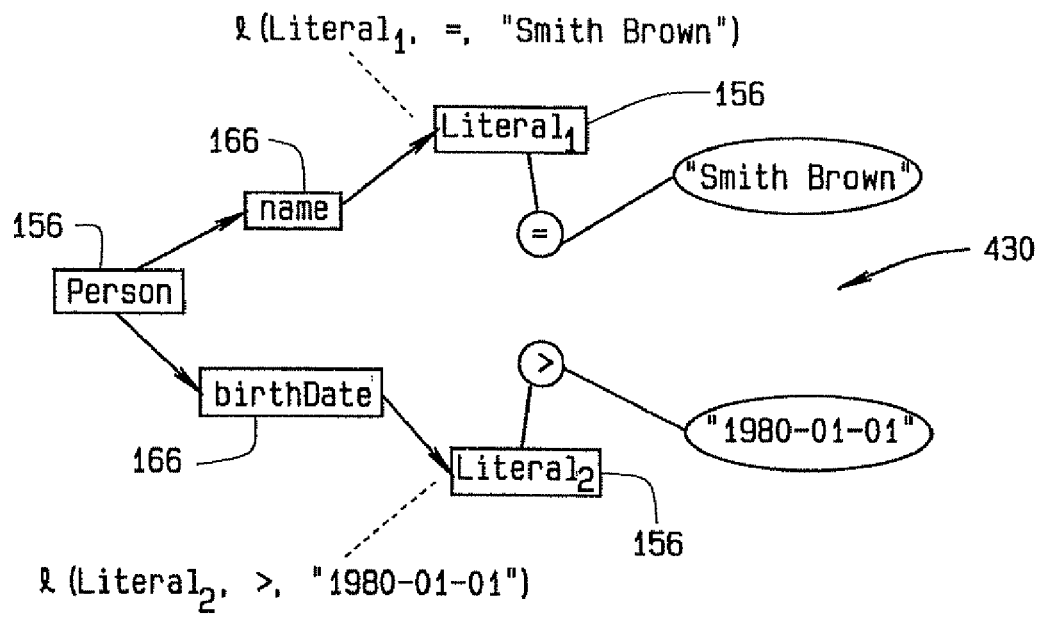
FIG. 9 is a diagram of a query including a conjunction in accordance with one implementation of the invention.

An exemplary query is indicated generally by reference number 430 in FIG. 9. A conjunction l ($\text{Literal}_1$, =, "Smith Brown") ∧ ($\text{Literal}_2$, >, "1980-01-01") is attached to the semantic query 430 with the semantics "Retrieve all the persons whose name is Smith Brown and whose birth date is later than Jan. 1, 1980."

Grouping and Aggregation

In conventional database systems, grouping and aggregation are typically implemented and optimized together. A grouping and aggregation request in a semantic query may be denoted by $G(f_{agg}, v_c, V_g)$, where $f_{agg}$ is one of a plurality of aggregate functions available in most query languages, including but not limited to "avg", "min", "max", "sum", and "count", where $v_c$ is a concept node on which the aggregation is applied, where $V_g$ is a collection of concept nodes on which the grouping request is based, and where each concept node allowed in $V_g$ has connection to $v_c$ through one or more edges.

Figure 10:
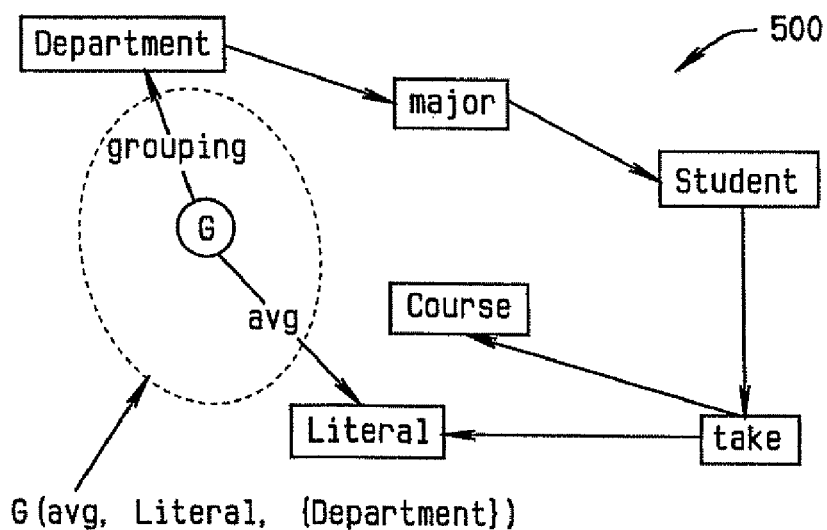
FIG. 10 is a diagram of a query in which grouping and aggregation is specified in accordance with one implementation of the invention.

An example of a semantic query including an aggregation request is indicated generally in FIG. 10 by reference number 500. The query 500 includes a request G to calculate, for each department, the average grade on the courses that all students who major in that department have taken.

Implementation

Various methods and systems implemented in accordance with principles of the invention are compatible with Semantic-Web standards. Ontologies, semantic queries, and semantic query results may be exported into standards such as RDF (Resource Description Framework), Datalog, DAML+OIL (DARPA Agent Markup Language) and/or OWL (Web Ontology language). In one implementation described below, internal query structures and a graphical query interface are implemented in conjunction with RDF.

Figure 11A:
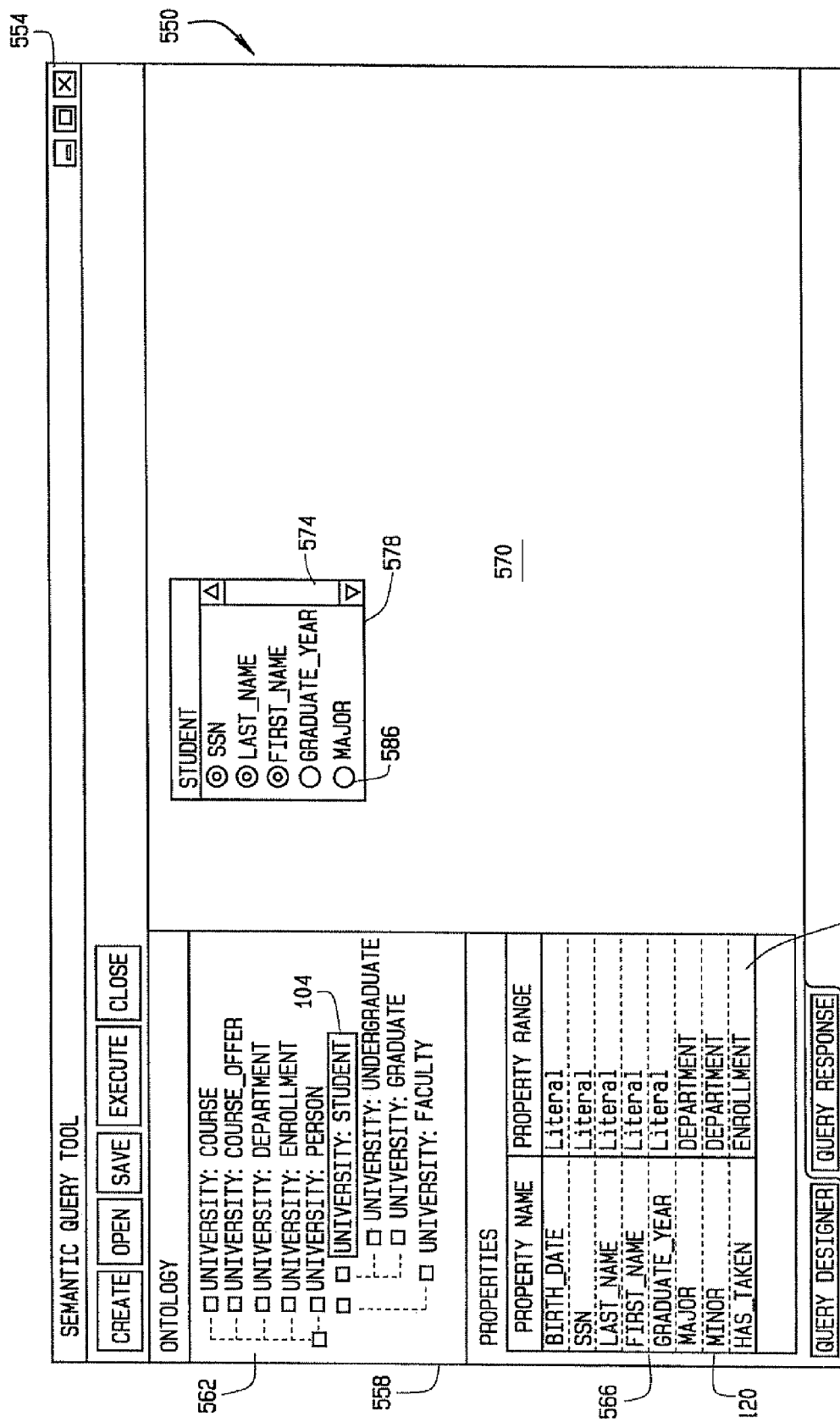
FIGS. 11A and 11B are screenshots of a graphical query interface in accordance with one implementation of the invention.
Figure 11B:
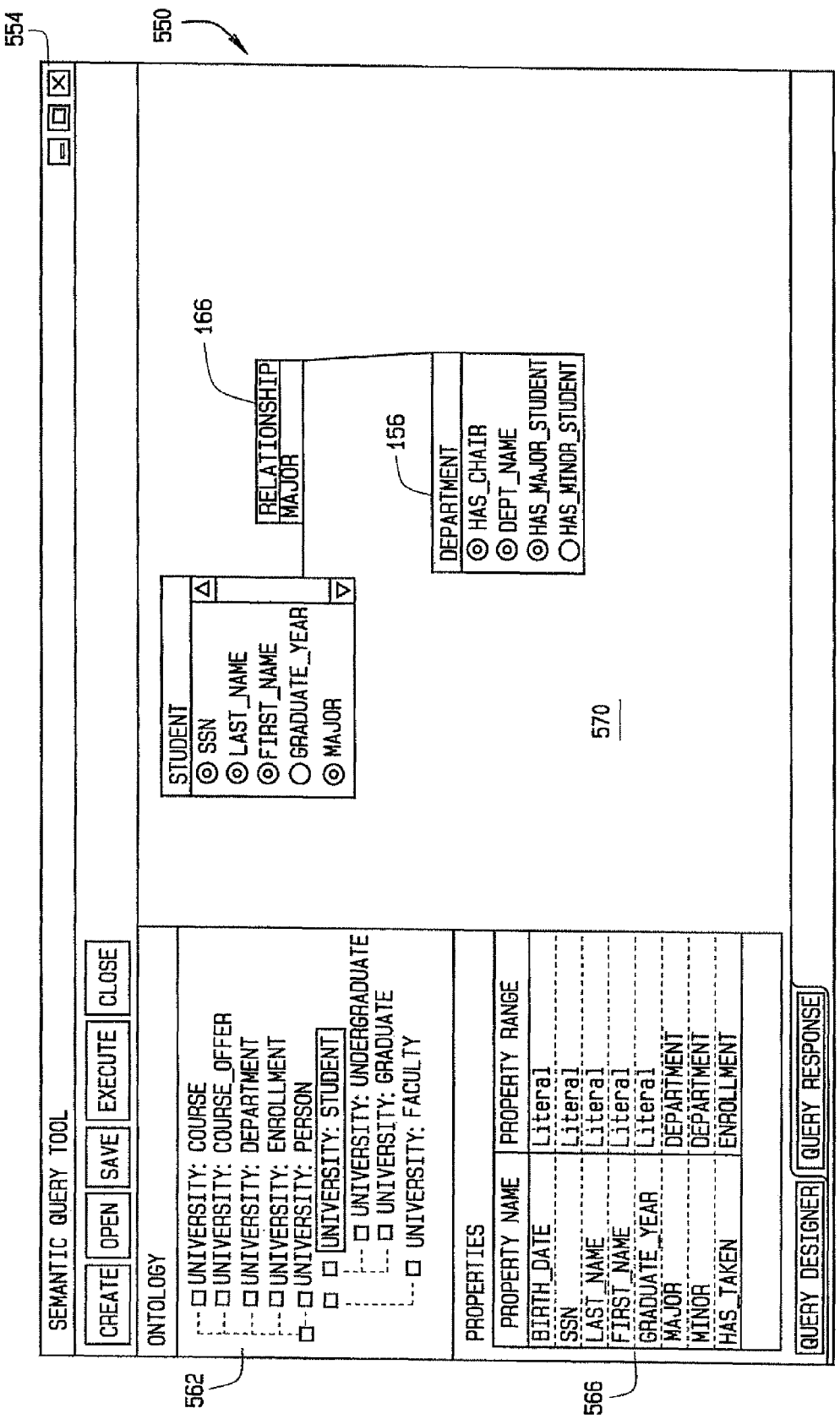

A sequence of screenshots of one implementation of a graphical query interface is indicated generally in FIGS. 11A and 11B by reference number 550. A window 554 includes a part 558 in which the referenced ontology 40 is displayed, for example, in RDFS (RDF Schema). Concepts 104 (corresponding to classes in RDF) are listed in a top window portion 562. Relationships 120 (corresponding to properties in RDF) for each selected concept 104 are displayed in a table 566. The window 554 also includes a query designer panel 570. Where a user wishes to start with a concept STUDENT, s/he can select the concept 104 or class and drag-drop it in the query designer panel 570. A copy 574 of the concept STUDENT is displayed in the panel 570 with a list 578 of corresponding relationships 120. Depending on range concepts 582 related to the selected concept, relationships 120 may be further categorized. For example, into two categories, and labeled by different colors. For example, a relationship 120 FIRST NAME is from the concept STUDENT to a concept 104 Literal, and thus may be labeled in a color different from a color used to label the relationship 120 MAJOR, which is from the concept STUDENT to another concept DEPARTMENT. If a user wishes to retrieve the first name, last name, and social security number of a student, then s/he can express his/her intention, for example, by mouse-clicking radio-buttons 586 that represent the corresponding relationships 120 respectively. For example, if the user wishes to retrieve a student's major department information, s/he may click the radio-button 586 corresponding to the relationship MAJOR. A navigation thus is defined from the concept STUDENT to the concept DEPARTMENT and displayed in the panel 570 as shown in FIG. 11B. A relationship node 166 (MAJOR) and a concept node 156 (DEPARTMENT) are displayed in the query designer panel 570.

Figure 12:
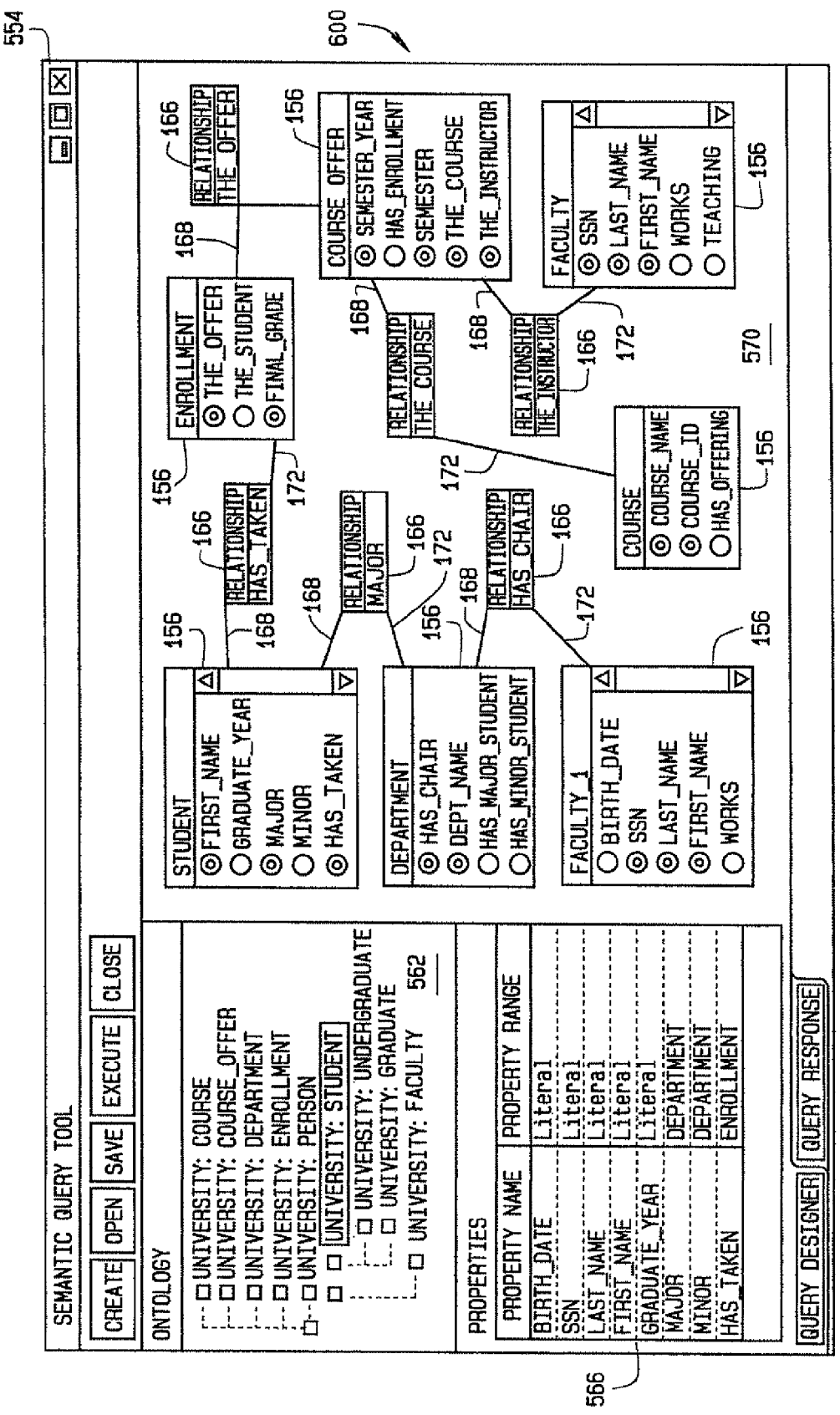
FIG. 12 is a screenshot of a graphical query interface displaying a semantic query in accordance with one implementation of the invention.

An exemplary semantic query is indicated generally in FIG. 12 by reference number 600. Semantics for the query 600 can be understood to indicate that a user wishes to retrieve student information including last and first names, courses taken, and major department. For each taken course, the user wishes to retrieve the final grade, the instructor (including names and social security number) who taught the course, and the particular year and semester that the student took the course. For each major department, the user wants the department name and the names and social security number of the department chair-person.

The query 600 may be understood to be a relatively simple example of a semantic query. For example, query constraints are not defined in the query 600. However, the query 600 also can be understood, for example, to entail relatively complex SQL query statements for retrieving the information where the requested data is stored in a plurality of tables in a plurality of relational databases. A user typically would have to define a long join chain combined with union operations to retrieve the data. Furthermore, capturing semantics in SQL query statements would be difficult if not impossible where the user has insufficient knowledge to understand the relational logical database structure.

Figure 13:
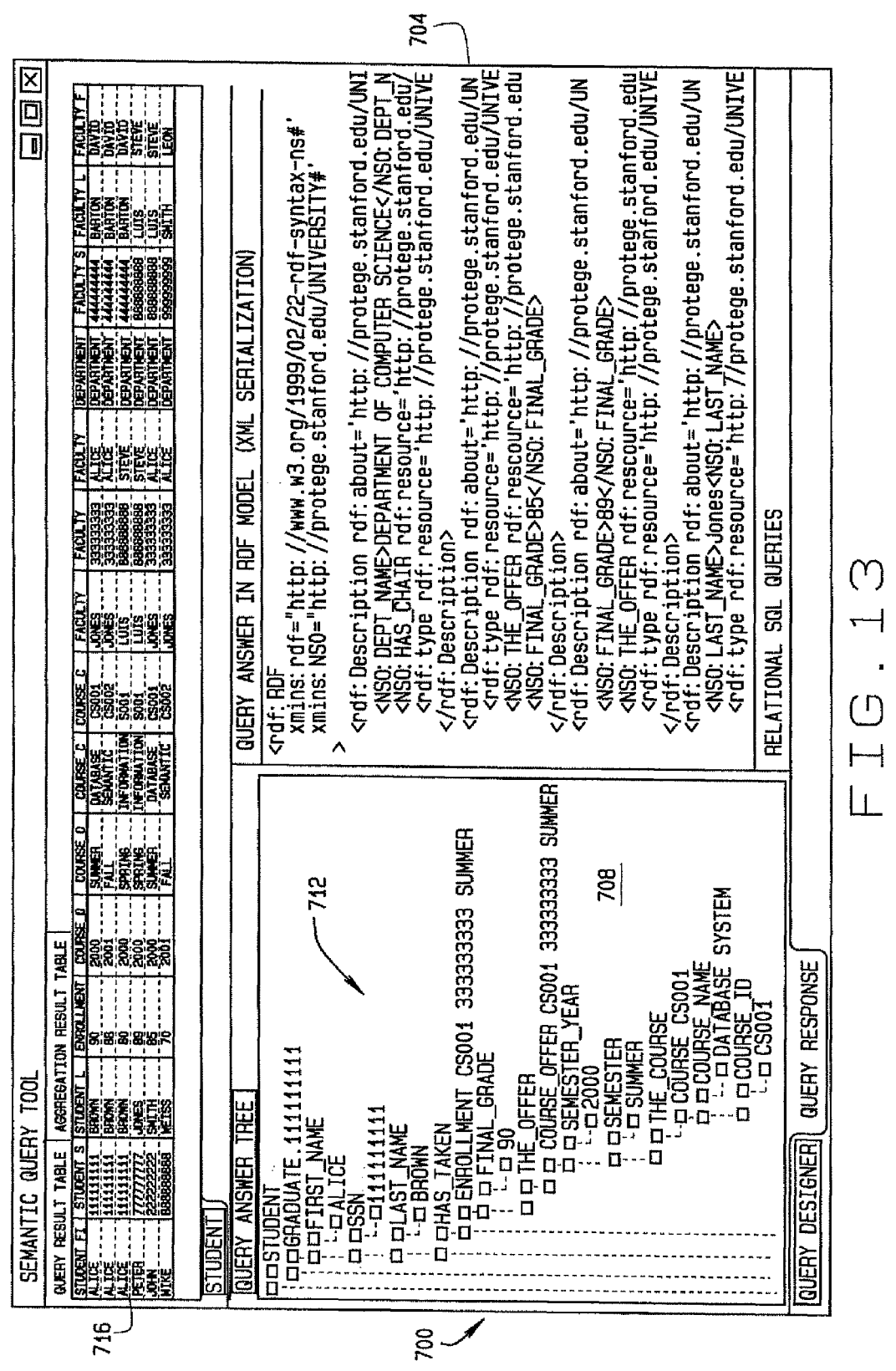

Results of the query 600 are indicated generally in FIG. 13 by reference number 700. In a panel 704 is provided an XML serialization of RDF documents referring to the referenced ontology 40 (in the present example, a RDF Schema) shown in FIGS. 11A and 11B. A panel 708 includes a graphical display of returned query answers in a tree structure 712. Answers are also returned in the form of a table 716. Different colors may be used to label different types of data in the answer tree 712. For example, semantic elements (e.g., concepts 104 and relationships 120) defined in the ontology 40 may be labeled in one color, an instance of a particular concept 104 may be labeled with its URI in another color, and values of any relationship 120 having Literal as a range may be labeled in yet another color.

Implementations of the foregoing querying method and system can make it possible and easy for information consumers to define queries at a semantic level. Implementations are neutral to any particular semantic representation format, including but not limited to EER models, RDF/DAML-OIL and/or Datalog representations. Implementations are based upon basic semantic elements, e.g., concepts and relationships, which are available in any semantic model.

Using the above query method requires little prior training and is relatively intuitive for the average user to learn. The foregoing method is sufficiently powerful for users to express most if not all typical query criteria. Complex logical data structures and data distribution are hidden from users. Accordingly, users do not have to know much about underlying data sources. Users can formulate their queries in a semantic way based on their knowledge of the application domain. Query answers are delivered as an instantiation of the referenced ontology and therefore are semantically understandable. The foregoing query interface is operable with respect to a plurality of types of information sources, thereby enhancing interoperability of heterogeneous data systems. Its power of expressiveness is comparable to that of SQL, with logical expression and aggregation supported.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of providing information from at least one information resource, said method comprising:
   providing, via a graphical user interface (GUI), a plurality of generic ontological constructs made available in accordance with a set of semantic query validity rules, the rules enforcing neutrality of a semantic query relative to substantially all ontological representation languages such that each and any semantic query specified by a user via the GUI and validated by the semantic query validity rules is representable in substantially all ontological representation languages, each of the constructs having a counterpart in each of the substantially all ontological representation languages;
   receiving from a user via the GUI a semantic query including one or more of the generic constructs, the received semantic query referencing an ontology relating to a domain of the at least one information resource;
   inferring from the included constructs a representation of the received semantic query in an ontology representation language associated with the referenced ontology; and using the inferred query representation to access the at least one information resource;
said method performed by at least one processor configured with memory.

2. The method of claim 1, further comprising returning an answer to the semantic query as an instantiation of the referenced ontology.

3. The method of claim 1, wherein receiving a semantic query from the user comprises:
displaying at least a part of the referenced ontology via the GUI; and
receiving a selection from the user of one or more constructs from the displayed at least a part of the referenced ontology to specify the semantic query.

4. The method of claim 1, wherein the at least one information resource includes at least one of the following: a relational database, an xml repository, a table structured layout, a hierarchical/network structure, and a RDF repository.

5. The method of claim 1, wherein receiving a semantic query from the user comprises:
allowing the user to select a first concept node for display via the GUI;
receiving a selection by the user of a relationship node for the displayed first concept node; and
defining and displaying a semantic navigation from the first concept node to a second concept node based on the selected relationship node.

6. The method of claim 1, further comprising returning an answer to the semantic query using data from a plurality of information resources.

7. The method of claim 1, wherein the received semantic query includes one or more instances of the one or more constructs.

8. A computer system that allows a user to semantically query at least one information resource of the computer system, the computer system comprising:
one or more processors and memory configured to:
provide, via a graphical user interface (GUI), a plurality of generic ontological constructs made available in accordance with a set of semantic query validity rules that enforce neutrality of a semantic query relative to substantially all ontological representation languages such that each and any semantic query specified by a user via the GUI and validated by the semantic query validity rules is representable in substantially all ontological representation languages;
receive from the user via the GUI a semantic query including one or more of the generic constructs referencing an ontology relating to a domain of the at least one information resource;
use inferences from the included constructs to obtain a representation of the received semantic query in an ontology representation language associated with the referenced ontology, the ontology representation language structured to provide the inferences from the included constructs; and
use the inferred query representation to access the at least one information resource.

9. The system of claim 8, wherein to receive a semantic query from the user comprises:
to display at least a part of the referenced ontology via the GUI; and
to receive a selection from the user of one or more constructs from the displayed at least a part of the referenced ontology to specify the semantic query.

10. The system of claim 8, further configured to deliver an answer to the query as an instantiation of the referenced ontology.

11. The system of claim 8, wherein to receive a semantic query from the user comprises:
to allow the user to select a first concept node for display via the GUI;
to receive a selection by the user of a relationship node for the displayed first concept node; and
to define and display a semantic navigation from the first concept node to a second concept node based on the selected relationship node.

12. The system of claim 8, further configured to:
represent the query as one or more RDF-based documents; and
serialize the documents using XML.

13. One or more tangible computer-readable storage media comprising instructions stored in the media and executable by a processor to
provide, via a graphical user interface (GUI), a plurality of generic ontological constructs made available in accordance with a set of semantic query validity rules enforcing neutrality of a semantic query relative to substantially all ontological representation languages such that each and any semantic query specified by a user via the GUI and validated by the semantic query validity rules is representable in substantially all ontological representation languages;
receive from a user a user semantic query including one or more of the constructs referencing an ontology relating to a domain of at least one information resource;
use inferences from the included constructs to obtain a representation of the user semantic query in an ontology representation language associated with the referenced ontology;
use the query representation obtained from the user query to access the at least one information resource; and
return an answer to the user as an instantiation of the referenced ontology;
the generic constructs having at least one of the following: a concept, and a relationship.

14. The media of claim 13, wherein the user includes an instantiation of one of the generic constructs in the user query, the media further comprising instructions executable by a processor to use the instantiation to obtain the query representation.

15. The media of claim 13, further comprising instructions executable by a processor to display at least a part of the referenced ontology via the GUI; and
to receive a selection from the user of one or more constructs from the displayed at least a part of the referenced ontology to specify the semantic query.

16. The media of claim 13, further comprising instructions executable by a processor to allow the user to select a first concept node for display via the GUI;
to receive a selection by the user of a relationship node for the displayed first concept node; and
to define and display a semantic navigation from the first concept node to a second concept node based on the selected relationship node.

17. The media of claim 13, further comprising instructions executable by a processor to receive via the GUI a plurality of node selections by the user to define the semantic query.

* * * * *